United States Patent [19]
Percevaut

[11] 3,933,450
[45] Jan. 20, 1976

[54] PURIFIER FOR THE PHYSICAL-CHEMICAL TREATMENT OF COMBUSTION GASES AND OTHER GASES CONTAINING POLLUTING OR NOXIOUS CONSTITUENTS

[76] Inventor: Emile Henri Gabriel Percevaut, Route de Longjumeau, Chilly Mazarin (Essonne), France

[22] Filed: Feb. 5, 1974

[21] Appl. No.: 439,944

[30] Foreign Application Priority Data
Feb. 7, 1973   France .............................. 73.04376

[52] U.S. Cl. ...................... 55/223; 55/238; 55/257; 55/319; 55/440; 55/463; 261/79 A; 261/116
[51] Int. Cl.² ......................................... B01D 47/06
[58] Field of Search ............. 55/223, 226, 228, 235, 55/238, 257, 260, 319, 336, 337, 440, 462, 463; 261/79 A, 115, 116; 23/277 R

[56] References Cited
UNITED STATES PATENTS

| | | | |
|---|---|---|---|
| 1,961,956 | 6/1934 | Bleibtreu et al. .................... 55/226 |
| 2,596,782 | 5/1952 | Moore ............................... 55/257 X |
| 2,840,454 | 6/1958 | Tomlinson et al. ............ 261/79 A X |
| 3,225,523 | 12/1965 | Wiebe .......................... 261/79 A X |
| 3,315,445 | 4/1967 | De Seversky ...................... 55/257 X |
| 3,566,582 | 3/1971 | Yankura ........................... 55/228 X |
| 3,631,656 | 1/1972 | Hausberg et al. .................. 55/440 X |
| 3,777,457 | 12/1973 | Laube .................................... 55/223 |

Primary Examiner—Frank W. Lutter
Assistant Examiner—William Cuchlinski, Jr.
Attorney, Agent, or Firm—Parmelee, Johnson & Bollinger

[57] ABSTRACT

An apparatus for the treatment of gases containing polluting or noxious constituents which comprises a washing and centrifuging chamber, means to spray a washing liquid, specific to the chemical reaction it is desired to obtain with the gas, means to augment the length of the path travelled by the gas-liquid droplet mixture and promote the chemical reaction between the gas and liquid, means to separate the gas and liquid and recover both the gas and liquid.

8 Claims, 4 Drawing Figures

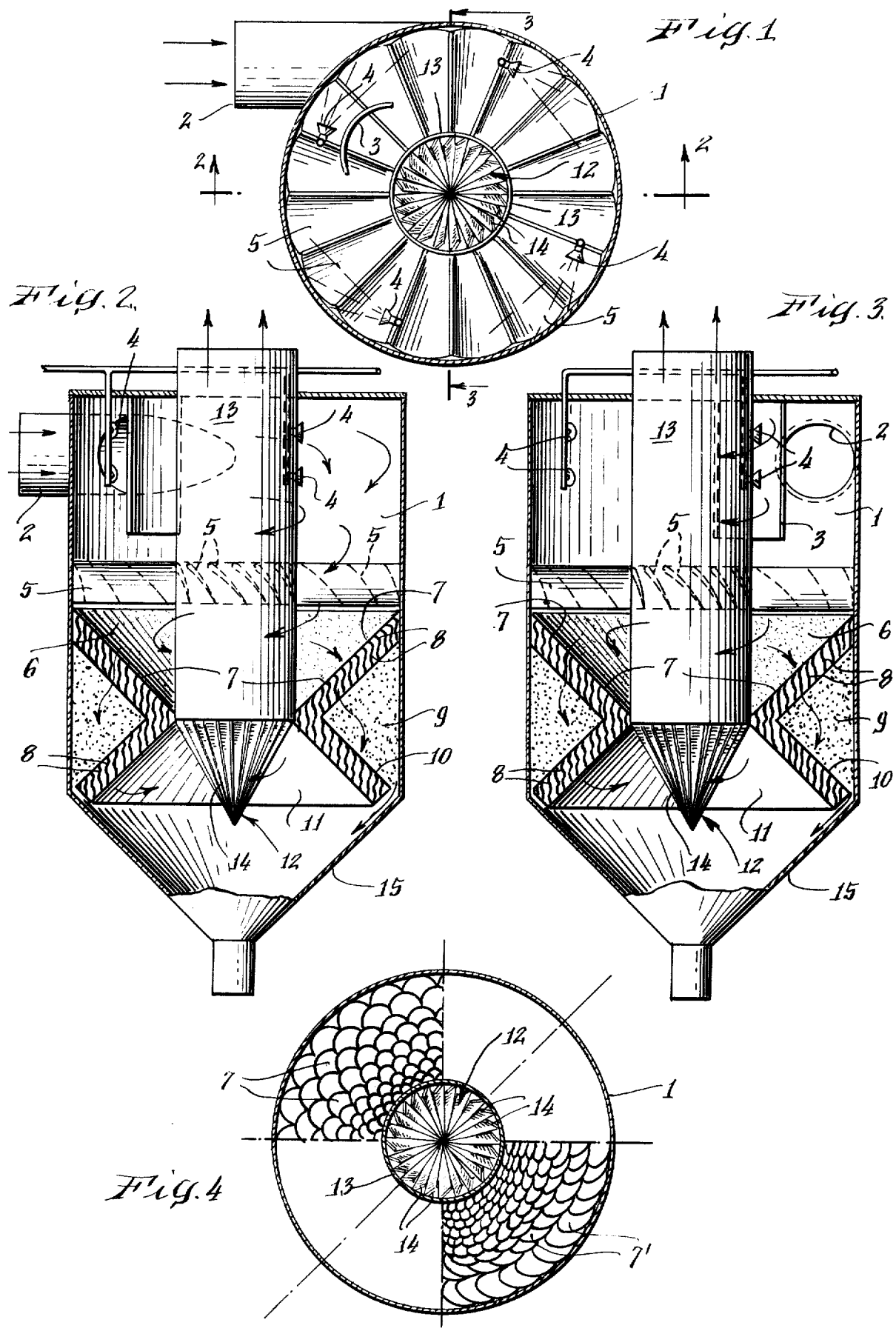

PURIFIER FOR THE PHYSICAL-CHEMICAL TREATMENT OF COMBUSTION GASES AND OTHER GASES CONTAINING POLLUTING OR NOXIOUS CONSTITUENTS

The present invention relates to a purifier for the physical-chemical treatment of combustion gases and other gases containing polluting ot noxious constituents.

Atmospheric pollution control measures require equipment capable of completely purifying gases resulting in particular from various types of combustion.

Anti-pollution devices for incinerators and boilers are already known, but they are generally designed for removing dust from gases and do not have any action on their toxicity.

Chemical treatment devices are also known which involve the gases being washed, notably washers with filtering layers, enabling the gases to be absorbed effectively by intimate wetting, but they cause a considerable loss of charge and the clogging up of the equipment, and allow only a small throughput to be obtained.

Other known dynamic devices give greater throughputs, particularly centrifugal washers of the cyclone type, but absorption by washing is insufficient because the time during which the gases are in contact with the droplets of the washing liquid is too short, since the path travelled by these gases and these droplets through the cyclone can be represented as a short spiral, between the inlet and the outlet of the cyclone, which does not allow an intimate, repeated and prolonged contact to be obtained. In addition, the final drying of the gas is insufficient.

It would therefore be desirable that the purifying action be a combination of a physical treatment (dust removal) of the gases, and a chemical treatment (absorption and neutralisation).

The object of the invention is to overcome the disadvantages of purifiers, and aims to provide a purifying device of the cyclone washer type, which treats physically-chemically combustion gases and other gases containing polluting or noxious constituents.

To this end, the invention relates to a purifier characterised in that it comprises a a washing and centrifugeing chamber, receiving the gas to be treated and in which a washing liquid, specific to the chemical reaction that is desired to obtain with the gas, is sprayed into the gaseous atmosphere, this chamber being followed by means of augmenting the length of the gas-liquid droplets mixture path and promoting the reaction of the liquid with the gas, with a minimum loss of charge, as well as stages and chambers for separating and recovering the treatment liquid from the dry gas passing to the exit.

According to another characteristic feature of the invention, the purifier comprises at least one sprayer located in the neck of a convergent-divergent passage, formed by at least one vertical deflector and the inner wall of the cylinder, and designed to accentuate, by means of the Venturi effect, the centrifueging movement, the liquid spraying pressure being greater than that of the gas. The means of augmenting the length of the path followed by the mixture comprises a ring with blades which direct the gas-droplets mixture to at least to one wetting and drying system.

It is particularly advantageous for the system to comprise two truncated cones with their apices facing one another, each constituted by a honeycomb vane structure.

The exit of the purifier is provided with means of drying the gas before it escapes into the atmosphere.

To this end, a static turbine is located at the entry of the central gas evacuation duct, which turbine has the shape of a cone consisting of deflecting blades to give the gas droplets mixture a giratory movement designed to separate the liquid from the gas by centrifugeing.

The successive stages and chambers in which the dust is removed and the gases are absorbed in an optimal manner, thanks to a prolonged and repeated centrifugeing and washing action, with a very high degree of drying and without risk of clogging, enables any gas to be treated by physical-chemical means, particularly those gases which are produced in various combustion processes, such as those involved in central heating, industry, and the incineration of garbage and industrial waste.

Purification according to the invention has the great advantage of using a means of simple construction and operation, as well as providing an efficient means of treating polluting gases.

A purifier according to the invention is represented by way of a non-limitative example in the accompanying figures in which:

FIG. 1 is a plan view of the purifier as seen with the top of the upper chamber removed;

FIG. 2 is a front view, partially in section, along II-II in FIG. 1;

FIG. 3 is a view from the right, partially sectionned, along III-III in FIG. 1;

FIG. 4 is a simplified plan view of the truncated system, showing two variants of the honeycombs in the right hand part and in the left hand part of the figure.

The device comprises a cylindrical upper part or upper chamber 1, which has the form of a vertical cyclone, and into which pass the gases to be purified by means of a tangential duct 2, comprising, on penetrating into the chamber, a curved and vertical deflector 3. The deflector causes the gases to be auto-recycled by the action of the washers-sprayers 4, creating a Venturi effect, and accentuating the centrifuging effect of the gases and the washing by the sprayed liquid, which is specific to the chemical reaction it is desired to obtain. The liquid spraying pressure of said washer-sprayers 4 is greater than the pressure of the gases in the first chamber 1.

This first chamber comprises, at its lower part, a horizontal ring, formed by helicoidal blades 5, the effect of which is, on one hand, to give the gases and sprayed liquid droplets a greater centrifugal movement produced by their tangential entry into the cyclone, and on the other, to project this gas-droplets mixture, through the chamber 6, against the walls of a truncated circular system 7 located below. This truncated circular system 7 is constituted by honeycomb, curved vanes 8 of which the entry faces are oriented in the gyrating direction produced by the blades 5 following an angle formed with the blades 5 so that this orientation of the vanes 8 produce forced wetting and contact through the multitude of the molecules and particles of the gas and the liquid which strike violently against the walls of these oblique, curved vanes, through which the gas and liquid are subsequently ejected peripherically into a third chamber 9 located below.

These shocks and wetting operations are added to the effects of turbulence on the gas streams in this chamber 9, which enables a maximum absorption of the gases by the sprayed droplets to be obtained in the chamber 1.

This third chamber 9 is closed at its base by a second system 10 of truncated cone shape, and of which the small base is directed toward that of the first system located above. This second system also consists of honeycomb, curved vanes. The entry face of these curved vanes is oriented in a direction opposite to that of the gyratory movement of the cyclone, which produces a drying effect by agglomerating the sprayed, very small diameter liquid particles, since in order to be evacuated into a central duct, the gas-droplets mixture is divided into multi-gas streams which describe a rotation of 180°, causing the separation of droplets of greater density, which flow away peripherically toward the base of the cyclone.

The gases then penetrate into a last chamber 11, located in the central, lower area of the purifier, where a final centrifugal separation and liquid removal operation is carried out on the gases by means of a static turbine 12. This static turbine has a truncated shape, of which the apex is directed downward; it covers the central gas evacuation duct 13.

This static turbine 12 is constituted by the deflectors 14, in the form of segments of a truncated cone, partly overlapping one another, to leave a desired space between them, the entry flow of the gases between the deflectors being directed in the gyratory direction in which they enter the cyclone. This arrangement in the turbine gives the gases that are leaving a convergent, conical, helicoidal movement. This violent movement of the gases produces the removal of the droplets and various residues, which are projected peripherally toward the base of the purifier in the form of a hopper 15, whereas the purified gases are discharged upward by the central evacuation duct 13.

It is to be understood that the invention is not limited to the examples herein above described and illustrated, and on the basis of which other modes and forms of embodiment can be envisaged without departing from the scope of the invention.

What I claim is:

1. A purifier of the cyclone-washer type for treating gases containing polluting or noxious constituents comprising:
    a cylindrical wall concentric about a vertical axis defining a first chamber therein,
    inlet duct means communicating with said first chamber through which gases to be treated can enter said first chamber,
    said inlet duct means being directed tangentially into said first chamber for swirling the gases entering within said first chamber in a first direction about said vertical axis,
    spray means associated with said first chamber for spraying washing liquid droplets into the swirling gases in said first chamber for treating gases therein,
    said cylindrical wall extending downwardly below said first chamber,
    a ring of helicoidal blades positioned within said cylindrical wall in the lower part of said first chamber, said helicoidal blades projecting the swirling mixture of gases and liquid droplets downwardly from said first chamber within said cylindrical wall below said ring of blades,
    a honeycomb structure of curved vanes positioned within said cylindrical wall below said ring of blades for increasing the length of the path traversed by said mixture of gases and liquid droplets,
    a hopper at lower part of said cylindrical wall below said honeycomb structure for receiving the washing liquid, and
    a central evacuation duct communicating with the region within said cylindrical wall below said honeycomb structure and extending upwardly along said axis.

2. A purifier of the cyclone-washer type for treating gases containing polluting or noxious constituents, as claimed in claim 1, in which:
    said honeycomb structure is formed by two truncated conical honeycombs of curved vanes each concentric about said axis,
    said truncated conical honeycombs being positioned with their small ends adjacent one to another.

3. A purifier of the cyclone-washer type for treating gases containing polluting or noxious constituents, as claimed in claim 1, in which:
    a static turbine is located at the lower end of said central evacuation duct,
    said turbine having a conical configuration with its narrow end extending downwardly,
    said turbine including a plurality of deflecting blades directing the gases inwardly into the lower end of said evacuation duct in the same direction of swirling motion as the swirling direction of the gases entering said first chamber.

4. A purifier of the cyclone-washer type for treating gases containing polluting or noxious constituents, as claimed in claim 1, in which:
    said honeycomb structure includes two truncated conical systems of curved vanes,
    each of said truncated conical systems of curved vanes extending around said central evacuation duct, and
    one of said truncated conical systems being positioned above the other.

5. A purifier of the cyclone-washer type for treating gases containing polluting or noxious constituents, as claimed in claim 4, in which:
    one of said truncated conical systems of curved vanes is inverted with respect to the other.

6. A purifier of the cyclone-washer type for treating gases containing polluting or noxious constituents, as claimed in claim 4, in which:
    the curved vanes in said two conical systems are arranged according to parallel planes superimposed and perpendicular to said vertical axis.

7. A purifier of the cyclone-washer type for treating gases containing polluting or noxious constituents, as claimed in claim 1, in which
    said honeycomb structure includes a first and a second system of curved vanes,
    each of said systems of curved vanes extending around said evacuation duct with said first system being positioned above said second system,
    said first system of curved vanes defining entry faces directed in said first direction of swirling movement about said vertical axis and curving obliquely therefrom for producing forced wetting and contact of the gases and droplets striking violently against the walls of these oblique curved vanes, and
    said second system of curved vanes defining entry faces oriented in a direction opposite to said first direction of swirling motion for causing the gas streams passing through said second system to turn into the opposite direction for producing a drying effect by agglomerating the sprayed liquid droplets.

8. A purifier of the cyclone-washer type for treating gases containing polluting or noxious constituents comprising:
- a cylindrical wall concentric about an axis defining a first chamber therein,
- inlet duct means communicating with said first chamber through which gases to be treated can enter said first chamber,
- said inlet duct means being directed into said first chamber off from said axis for producing a gyratory movement about said axis of the gases within said first chamber,
- spray means associated with said first chamber for spraying washing liquid droplets into the moving gases within said first chamber,
- said cylindrical wall extending beyond said first chamber defining a second chamber,
- a ring of blades positioned within said cylindrical wall between said first and second chambers for directing the gyratory moving mixture of gases and liquid droplets into said second chamber,
- a honeycomb structure containing multiple oblique vanes positioned within said second chamber, said honeycomb structure including a first and a second system of vanes,
- said first system of oblique vanes having their entry faces oriented in the direction of the gyratory motion of said mixture,
- said second system of oblique vanes having their entry faces oriented in a direction opposite to said direction of gyratory motion,
- a hopper positioned beyond said honeycomb structure for receiving the washing liquid, and
- a central evacuation duct extending along said axis through said chambers, said evacuation duct communicating with the interior of said cylindrical wall beyond said honeycomb structure for carrying away the washed gases.

* * * * *